United States Patent [19]

Graf

[11] 4,180,594
[45] Dec. 25, 1979

[54] CEREAL-BASED PRODUCT AND PROCESS FOR ITS PRODUCTION

[75] Inventor: Manfred P. Graf, Blonay, Switzerland

[73] Assignee: Societe d'Assistance Technique pour Produits Nestle S.A., Lausanne, Switzerland

[21] Appl. No.: 874,351

[22] Filed: Feb. 1, 1978

[30] Foreign Application Priority Data

Feb. 7, 1977 [CH] Switzerland .................... 1450/77

[51] Int. Cl.² ............................................. A23L 1/164
[52] U.S. Cl. .................................. 426/560; 426/620
[58] Field of Search ............... 426/549, 560, 559, 620, 426/621, 625, 457, 446, 302, 307, 454, 517, 96

[56] References Cited

U.S. PATENT DOCUMENTS

| | | | |
|---|---|---|---|
| 3,852,491 | 12/1974 | Malzahn | 426/621 |
| 3,857,977 | 12/1974 | Huessy | 426/560 |
| 3,873,748 | 3/1975 | Schwab et al. | 426/446 |
| 3,911,142 | 10/1975 | Huelskamp et al. | 426/560 |
| 3,941,895 | 3/1976 | Ash | 426/549 |

Primary Examiner—Raymond N. Jones
Assistant Examiner—Elizabeth A. Hatcher
Attorney, Agent, or Firm—Watson Leavenworth Kelton & Taggart

[57] ABSTRACT

A cereal-based product containing, in addition to cereal, sugar, fat and whey powder.

A process for the production of a cereal-based product, comprising the steps of dry mixing flakes of cereal, sugar and whey powder, working the mixture in a continuous malaxator with blades with addition of edible oil and moisture at a temperature of from 110° to 150° C., cooling the mass obtained and breaking said mass into granulates.

2 Claims, 1 Drawing Figure

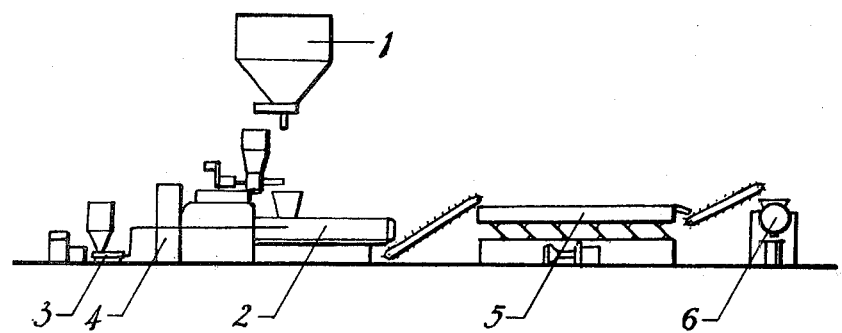

CEREAL-BASED PRODUCT AND PROCESS FOR ITS PRODUCTION

The present invention relates to a cereal-based product and a process for its manufacture.

There are a large number of cereal-based products enriched with various foods such as sugar, fats or powdered fruit juices.

The present invention provides a cereal-based product containing, in addition to cereal, sugar, fat and whey powder. In a preferred embodiment, it also contains soya protein.

The invention also provides a process for the production of a cereal-based product, which comprises dry mixing flakes of cereal, sugar and whey powder, then working the mixture in a continuous malaxator with blades with addition of edible oil and moisture at a temperature of from 110° to 150° C., cooling the mass thus obtained and breaking it up into granulates.

The accompanying drawing shows diagrammatically and by way of example the succession of operations in the process according to the invention.

In a preferred embodiment, the composition of the product is as follows, in percentages by weight:

| | |
|---|---|
| Flakes of cereals | 40–70 |
| Sugar | 5–25 |
| Vegetable oil | 5–10 |
| Whey powder | 10–20 |
| Coconut | 0–8 |
| Almonds | 0–5 |
| Soya protein | 0–10 |

The moisture content of the finished product, which is not critical, is usually from 3 to 10% and its specific gravity is from 400 to 600 grams per liter.

The flakes of cereals may be flakes of oats barley, wheat, rye, maize, etc.

The sugar will preferably be sucrose, unrefined sugar or invert sugar; other sugars, although usable, do not give such good organoleptic results or are more expensive. The sugar not only acts as a nutritive and sweetening agent but also gives the granulates obtained a certain mechanical strength.

Any edible oil with an appropriate taste is suitable such as almond oil, sunflower oil, sesame oil, corn oil, coconut oil, etc.

The addition of whey powder provides the product with the amino acids lacking in the cereals in an economical way. The product may be further enriched with soya, coconut, almond protein, etc.

In the example given, the flakes of cereals, the sugar and the whey powder are poured and mixed dry in a mixer 1 and the mixture is introduced into a continuous malaxator with blades 2. The casing of the malaxator and, if necessary, its axle are heated so as to bring the mixture to 110° to 150° C. Vegetable oil and saturated steam are injected into the malaxator at the same time as the mixture.

The vegetable oil is discharged by a pump 3 having a variable delivery rate which allows the quantity of oil to be dosed in proportion to the flow-rate of the mixture and is heated by a heater 4. The saturated steam is injected, preferably at the temperature of the mixture, so as to moisten the mixture slightly; very small quantities of water could be injected instead of the saturated steam. The residence time of the mixture in the malaxator is from 2 to 10 minutes.

Good results have been obtained with the "Ko-Kneter" continuous malaxator with blades, manufactured by Buss A.G. in Basel, Switzerland. This malaxator consists of a casing, traversed by circulating heating oil, the temperature of which may be as much as 250° C., which bears a number of blades or radial arms. Inside this casing is located an axle bearing a number of radial blades positioned between the blades of the casing. This axle rotates and oscillates in a length-wise direction.

An apparatus of this type has been used up until now for the production of pastry or chocolate. It might be expected that it would crush the flakes of cereals and discharge a powder. The mixture described above and treated in this apparatus surprisingly gives relatively hard fragments of variable dimensions. These are preferably cooled, by means of a fluidised bed 5 in the example shown, and broken down to the desired size by a mill 6 such as a Frewitt mill. In a preferred embodiment, the fragments are further sieved before packing so as to obtain a more regular granulometry.

The granulates are preferably given a size of from 3 to 10 mm so that they are easier to measure with a spoon and to eat. In this way, they may be eaten as they are or with milk, yogurt, fruit juice, etc.

I claim:
1. A process for the production of a hard, granulated cereal-based product, comprising the steps of:
   (a) dry mixing from 40 to 70% by weight cereal flakes, from 5 to 25% by weight sugar and from 10 to 20% by weight whey powder;
   (b) working the mixture in a continuous malaxator with blades with addition of from 5 to 10% by weight edible oil and from 3 to 10% moisture at a temperature of from 110° to 150° C. to produce hard fragments;
   (c) cooling the fragments obtained; and
   (d) breaking said fragments into granulates.
2. The hard, granulated cereal-based product produced by the process of claim 1.

* * * * *